Oct. 3, 1939. C. C. SOPER 2,175,038
METHOD OF AND APPARATUS FOR TESTING SPARK PLUGS
Filed Aug. 8, 1938 3 Sheets—Sheet 1

INVENTOR
CLEVELAND C. SOPER
BY
ATTORNEYS

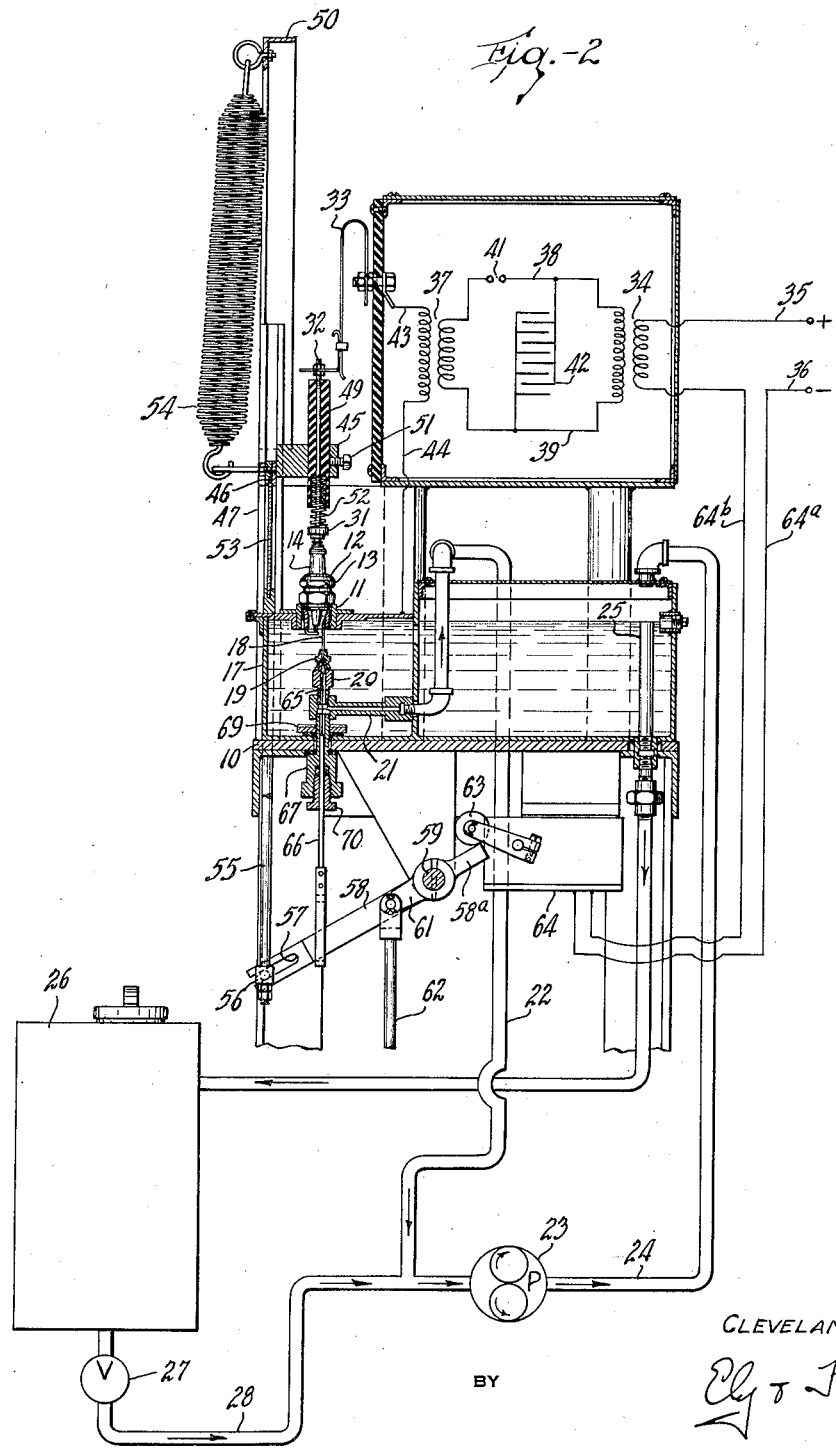

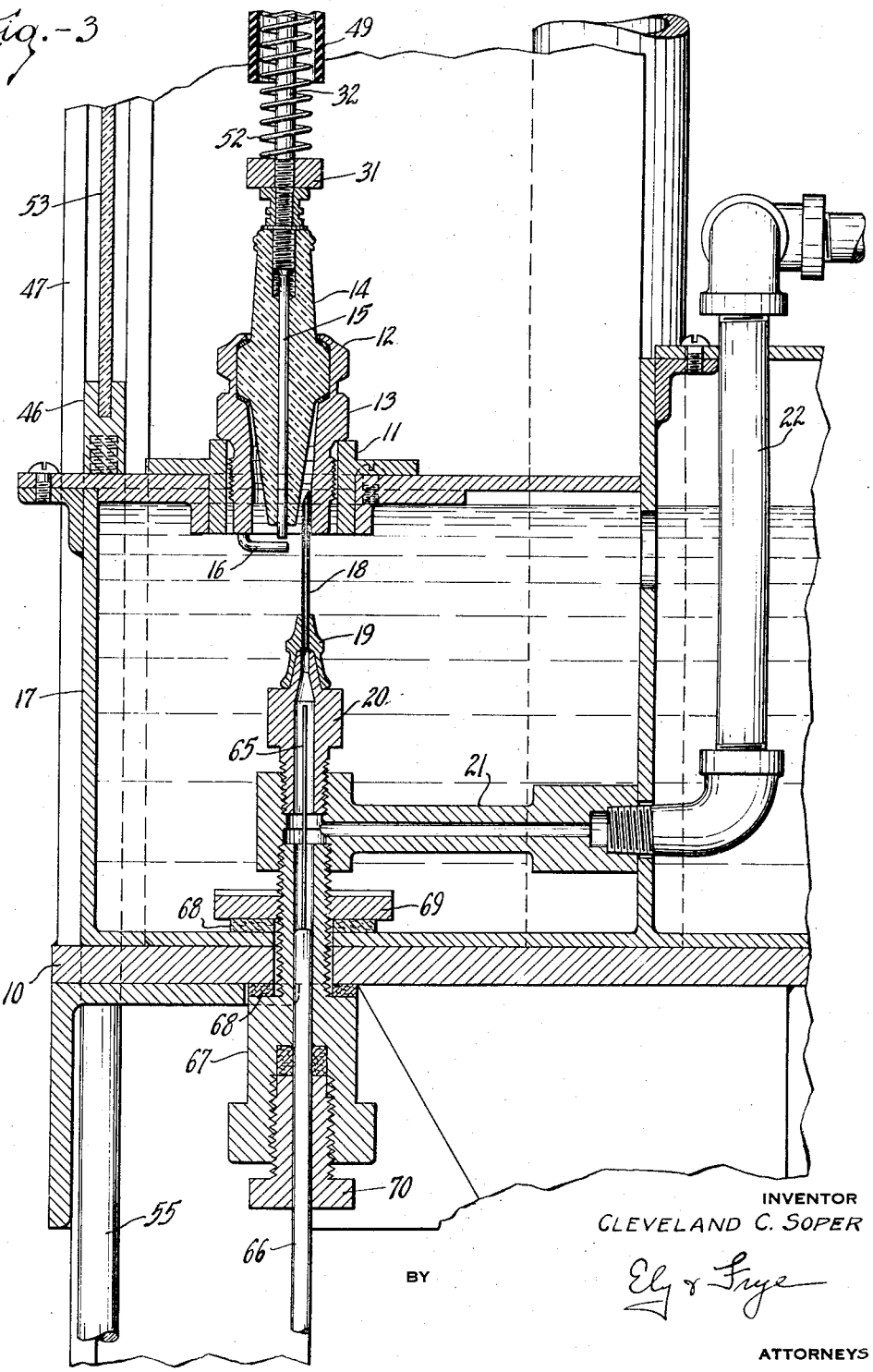

Patented Oct. 3, 1939

2,175,038

UNITED STATES PATENT OFFICE 2,175,038

METHOD OF AND APPARATUS FOR TESTING SPARK PLUGS

Cleveland C. Soper, Kent, Ohio, assignor to The Firestone Tire & Rubber Company, Akron, Ohio, a corporation of Ohio Application August 8, 1938, Serial No. 223,571

12 Claims. (Cl. 175—183)

This invention relates to spark plugs, and more especially to a method and apparatus for testing the insulating properties of porcelains in assembled spark plugs.

In the manufacture of spark plugs, the porcelain insulators thereof are sometimes cracked or otherwise damaged so that their insulating properties are impaired. Thus it is necessary to test the insulation of an assembled plug prior to offering it for sale.

One main object of this invention is to provide a safe, rapid, easily operated testing apparatus and method for determining the insulating properties of porcelains in assembled spark plugs.

The foregoing and other objects are achieved by mounting an assembled spark plug so that the metal sleeve thereof is grounded and with the lower end of the spark plug extending into a tank containing a liquid insulating medium, such as oil, to insulate the electrodes from each other. A movable contact, which is supplied with a high pressure electromotive force, is provided to supply the center electrode of the mounted spark plug with electrical pressure. Then, on normally insulated spark plugs, the high pressure voltage applied to the top of the center electrode can flow to the opposite electrode carried by the grounded metal sleeve only down and around the porcelain which surrounds the center electrode. This current flow is readily visible to the operator of the testing apparatus, and if such current takes other than the normal path, such as flowing through the porcelain, then the porcelain is shown to be a poor insulator. A shield, associated with the contact, automatically protects the operator when the electromotive force is applied to the porcelain.

In the accompanying drawings:

Figure 2 is a vertical cross-section of the apparatus of Figure 1 taken on line 2—2 of Figure 1;

Figure 3 is an enlargement of a portion of Figure 2.

Figure 1:
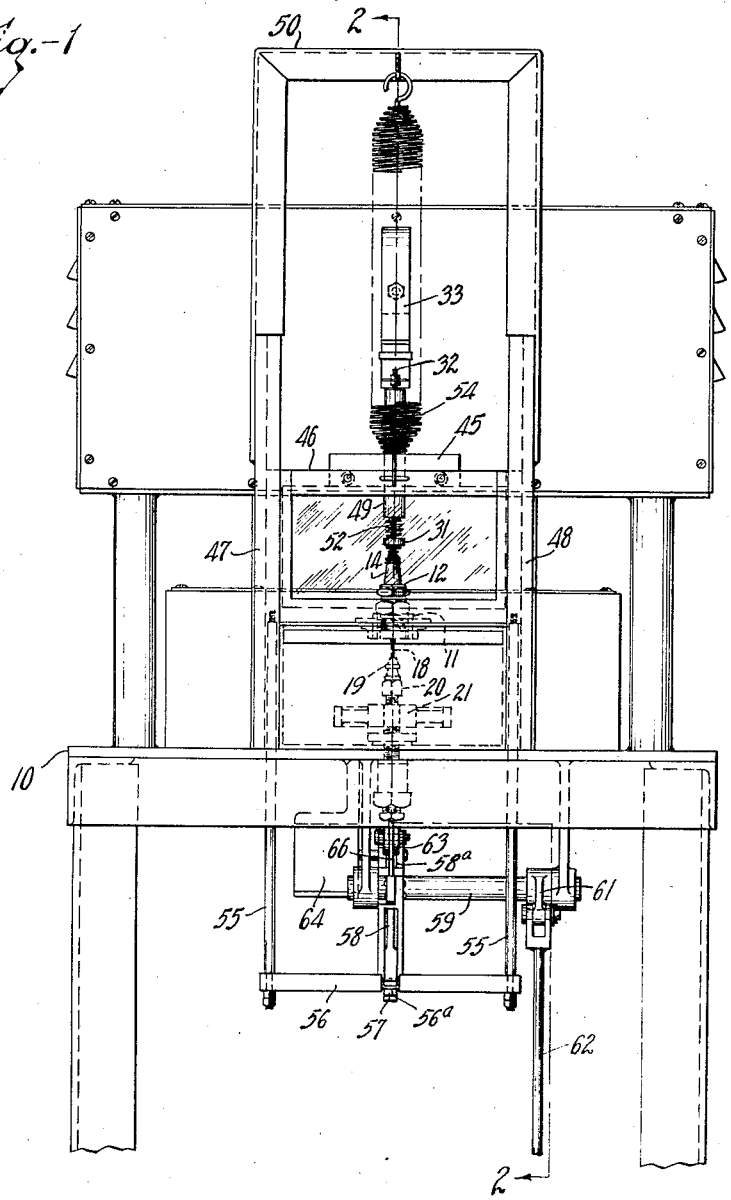
Figure 1 is a front elevation of apparatus embodying the invention.

Referring specifically to the drawings, the testing apparatus includes a frame 10 which carries an open-ended socket 11 that is adapted to receive a standard spark plug 12 therein. The socket 11 is grounded to the frame 10. The spark plug 12 is of standard construction and comprises a metal shell, or sleeve 13, porcelain 14, and a center electrode 15 which extends through the spark plug. The metal sleeve 13 carries an electrode 16 adjacent the lower end of the center electrode 15. Figure 3 shows that the socket 11 positions the spark plug 12 with its lower end extending into a tank 17 that is carried by the frame 10 and that contains any suitable liquid insulating medium, such as oil, to a predetermined height which is appreciably above the lower end of a spark plug in the socket 11.

In placing the spark plug on the socket a volume of air is trapped in the lower portion of the spark plug between the periphery of the porcelain 14 and the inner surface of the metal sleeve 13. This trapped air prevents oil from being forced by atmospheric pressure into the lower end of the spark plug to cover the electrode 16 and the exposed end of the center electrode 15 and insulate them from each other. Means are provided to remove such trapped air and, in this embodiment of the invention, these means comprise a long, slender, hollow needle 18 which is mounted in a vertical position in tank 17 by a tubular member 19. The needle 18 has an open end which is above the level of the oil in tank 17 and which is positioned to extend into the lower end of the spark plug on the socket 11 between the porcelain and metal sleeve thereof. The member 19 and needle 18 are supported by a hollow fitting, or nipple, 20 that connects to the bore of the needle. A hollow coupler 21 positions the fitting 20 and connects to the bore thereof to provide a connection between the needle and a pipe 22 which extends to a motor 23. Operation of the motor 23 produces a suction in the needle, draws trapped air from any spark plug on socket 11 and permits oil to be forced into the lower portion of the spark plug by atmospheric pressure. On continued operation of the motor with a spark plug on the socket 11, oil is drawn through the needle 18 and this is carried to the motor by the pipe 22. The out-put side of the motor connects to a pipe 24 which empties into the tank 17 that has an over-flow pipe 25 therein to prevent oil in the tank from increasing beyond a predetermined depth. The over-flow pipe 25 connects to a storage tank 26 and oil from the storage tank 26 is allowed to flow therefrom as desired by valve 27, which normally is open and which connects by pipe 28 to the pipe 22 leading to the in-put side of the motor 23. Thus, oil is maintained in the tank 17 at the desired height, even though the motor draws oil from the tank through the needle 18.

A contact 31 is provided for applying a high pressure electromotive force to the top of the center electrode 15 of the spark plug in the socket and it has a long cylindrical arm 32 extending therefrom which connects to a flexible electrical conductor 33. A suitable source of a high electromotive force is connected between the conductor 33 and the frame 10 and such force may be furnished by a step-up transformer 34 which is supplied with electric energy through leads 35 and 36. The secondary of the transformer 34 connects to the primary of a second step-up transformer 37 by leads 38 and 39 and a spark-gap 41 is present in the lead 38 which cooperates with several condensors 42 that are connected in parallel between the leads 38 and 39, to require a large voltage for current flow therethrough. The high voltage from the secondary of the transformer 37 is connected to the conductor 33 and the frame 10 by leads 43 and 44, respectively.

While any suitable voltage may be used, approximately 30 thousand volts has been applied to the center electrode of one type of spark plug tested. That voltage produced a flow of current around and down along the outer surface of the porcelain 14 to the metal sleeve 13 since the adjacent portions of the two electrodes of the spark plug are insulated from each other and the electric pressure is sufficient to produce an abnormal current flow. This current flow showed that the porcelain was an insulator for otherwise current would have been forced through the porcelain to reach the metal sleeve from the center electrode for that path is shorter and offers less resistance to current flow than the path around the porcelain.

The contact 31 is mounted upon a block 45 which is carried by a frame 46 that is slidably mounted in supports 47 and 48. The block 45 is insulated from the contact 31 by a rubber sleeve 49 which is carried around the arm 32 of the contact. A set screw 51 engages with the block 45 and bears upon the sleeve 49 and arm 32 to position the contact 31 while a spring 52 is placed around the lower portion of the arm 32 underneath the rubber insulator 49 to provide resiliency in the mounting of the contact 31. The frame 46 carries a glass plate 53 in a horizontal plane with the contact 31, which plate moves with the contact to come between and shield the operator of the testing machine from the contact when it is in operable position. A spring 54 is connected between a crossbar 50 carried by the supports 47 and 48 and the frame 46 to hold the frame normally in its uppermost vertical position in which position the contact 31 is an appreciable distance above the top of a spark plug mounted in the socket 11.

In order to control the position of the contact 31, a rod 55 engages with the bottom of the frame 46 at each side thereof and extends downwardly therefrom, the rods being connected together by a bar 56 at their lower ends. The bar 56 has a center portion 56a of reduced diameter which receives the slotted end 57 of an arm 58 which is secured to a shaft 59 that is journalled in the frame 10. The shaft 59 carries an arm 61 which connects to a control link 62 that extends downwardly from the shaft 59 to connect to suitable means, such as a foot treadle (not shown) for controlling the position of the arm 58 which in turn controls the position of the slidable frame 46 and contact 31. This is done by the arm 61 moving the arm 58 which raises and lowers the frame through rods 55. Thus the operator of the testing machine may control the position of contact 31 by his foot and have both hands free for other operations. Since the glass plate 53 moves with the contact 31, it prevents the operator from carelessly exposing himself to injury from the current flowing around a tested spark plug. Normally the spring 54 holds the contact 31 in inoperative position to require a positive force on the link 62 to operate the apparatus.

A contact arm 63 engages with an overhanging end 58a of the arm 58 to control the setting of a contact box 64 which is connected in lead 36 by leads 64a and 64b. Thus the contact in the box 64 is closed to provide an electric power supply when the contact arm 63 is held up by the arm 58a, as shown. Upon releasing the control link 62 the spring 54 pulls the arm 58 up and gravity, or spring means within the box 64, draws the contact arm 63 down to open the contact in the lead 36 and deaden the contact 31.

A long, thin needle 65 is provided to clean the hollow needle 18. This needle 65 is mounted on and extends vertically upward from a rod 66 which is supported on and moves with the arm 58. Figure 2 shows that the needle 65 is lowered when the glass plate 53 and contact 31 are lowered, and that the needle 65 will be drawn upwardly with the contact by spring 54. In its uppermost position, the needle 65 extends through the needle 18 to clean its bore. Suitable means, such as a housing 67, having sealing gaskets 68 associated therewith connect the rod 66 to the coupler 21 by a tight joint. A lock nut 69 holds the housing 67 in position while a bushing 70 engages with the lower end thereof to aid in positioning the rod 66. When no external force is applied to the link 62, the spring 54 pulls the glass plate 53, contact 31, arm 58, needle 65 up to set the apparatus automatically in inoperative position with the needle 65 inserted in the needle 18.

Atmospheric pressure may be admitted to the oil tank 17 by a small hole (not shown) in the upper portion thereof, if the tank is originally provided with an air-tight cover.

It will be observed that the apparatus of the invention not only automatically protects the operator of the testing machine from injury but also automatically cleans the hollow needle 18 after each testing operation. The apparatus functions to test the insulating properties of porcelains rapidly and safely without requiring costly test apparatus or operation.

In accordance with the patent statutes, I have illustrated and described the principle and mode of operation of an embodiment of the invention. However, it will be understood that various modifications can be made without departing from the scope of the invention as defined in the appended claims.

I claim:

1. Apparatus for testing the insulating properties of assembled spark plugs having a center electrode, a porcelain insulator surrounding same, and a metallic sleeve surrounding said insulator and provided with a ground electrode, said apparatus comprising an open-ended socket for the spark plug, a tank positioned immediately below said socket and adapted to receive the end of said spark plug, said tank containing oil to a level appreciably above the bottom of said spark plug, a hollow needle projecting upwardly in said oil tank and being constructed and arranged to extend into the lower end of said spark plug between said porcelain and metal sleeve, a suction pump connected to said needle to draw fluids therethrough and permit oil to rise up into the lower portion of said spark plug to insulate said electrodes from each other, means for grounding said metal sleeve, a member for contacting the top of said center electrode, mounting means supporting said member for movement to and from contact with said spark plug, means for providing a high-pressure electromotive force between said member and ground when said member is in contact with said spark plug, a shield for said socket carried by said mounting means, means for moving said member automatically into non-contacting relationship with said spark plug, cleaning means for said hollow needle associated therewith, and means connecting said cleaning means to said mounting means whereby said cleaning means is inserted into said hollow needle when said member is automatically moved to a non-contacting relationship with said spark plug.

2. Apparatus for testing the insulating properties of assembled spark plugs having a center electrode, a porcelain insulator surrounding same, and a metallic sleeve surrounding said insulator and provided with a ground electrode, said apparatus comprising an open-ended socket for the spark plug, a tank positioned immediately below said socket and adapted to receive the end of said spark plug, said tank containing oil to a level appreciably above the bottom of said spark plug, a hollow needle constructed and arranged to extend into the lower end of said spark plug between said porcelain and metal sleeve, a suction pump connected to said needle to draw fluids therethrough and enable oil to rise up into the lower portion of said spark plug to insulate said electrodes from each other, means for grounding said metal sleeve, a member for contacting the top of said center electrode, means for providing a high-pressure electromotive force between said member and ground, mounting means supporting said member for movement to and from contact with said spark plug, and means for moving said member automatically into non-contacting relationship with said spark plug.

3. Apparatus for testing the insulating properties of assembled spark plugs having a center electrode, a porcelain insulator surrounding same, and a metallic sleeve surrounding said insulator and provided with a ground electrode, said apparatus comprising an open-ended socket for the spark plug, a tank positioned immediately below said socket and adapted to receive the end of said spark plug, said tank containing oil to a level appreciably above the bottom of said spark plug, a hollow needle projecting upwardly in said oil tank and being constructed and arranged to extend into the lower end of said spark plug between said porcelain and metal sleeve, a suction pump connected to a portion of said needle to draw fluids therethrough and enable oil to rise up into the lower portion of said spark plug to insulate said electrodes from each other, means for grounding said metal sleeve, contact means for providing said center electrode with a high-pressure electromotive force, cleaning means for said hollow needle associated therewith, and means for inserting said cleaning means into said hollow needle when said contact means is moved to a non-contacting relationship with said spark plug.

4. Apparatus for testing the insulating properties of assembled spark plugs having a center electrode, a porcelain insulator surrounding same, and a metallic sleeve surrounding said insulator and provided with a ground electrode, said apparatus comprising an open-ended socket for the spark plug, a tank positioned immediately below said socket and adapted to receive the end of said spark plug, said tank containing oil to a level appreciably above the bottom of said spark plug, a hollow needle projecting upwardly in said oil tank and being constructed and arranged to extend into the lower end of said spark plug between said porcelain and metal sleeve, a suction pump connected to a portion of said needle to draw fluids therethrough and enable oil to rise up into the lower portion of said spark plug to insulate said electrodes from each other, means for grounding said metal sleeve, means for applying a high-pressure electromotive force between said center electrode and the ground whereby current flows from the top of said spark plug down around said porcelain to said metallic sleeve when said porcelain is a normal insulator.

5. Apparatus for testing spark plugs having a center electrode, a porcelain insulator surrounding same, and a metallic sleeve surrounding said insulator and provided with a ground electrode, said apparatus comprising a socket for the spark plug, a tank containing a liquid insulating medium positioned below said socket and being constructed to position the end of said spark plug in the insulating medium, a hollow needle extending upwardly in said tank to project into the lower portion of said spark plug, means for producing a suction at the upper end of said needle to draw entrapped air from said spark plug and enable insulating medium to surround said electrodes completely, means for grounding said metal sleeve, and means for applying a high electromotive force between said center electrode and ground whereby current flows from the top of said spark plug down around said porcelain to said metallic sleeve when said porcelain is a normal insulator.

6. Apparatus for testing assembled spark plugs having a center electrode, a porcelain insulator surrounding same, and a metallic sleeve surrounding said insulator and provided with a ground electrode, said apparatus comprising means for mounting the spark plug, means for insulating said electrodes from each other and preventing current flow therebetween, grounding means associated with said metallic sleeve, and means for applying an electromotive force between said center electrode and the ground whereby current flows from the top of said center electrode to the grounded metallic sleeve around said porcelain only when said porcelain is a good insulator.

7. Apparatus for testing assembled spark plugs having a center electrode, a porcelain insulator surrounding same, and a metallic sleeve surrounding said insulator and provided with a ground electrode, said apparatus comprising means for insulating said electrodes from each other and preventing normal current flow therebetween, and means for applying a high electromotive force between said electrodes whereby current flows therebetween in an abnormal manner.

8. In apparatus for testing the insulation of spark plugs having electrodes adjacent their lower ends, means for mounting a spark plug with its lower portion immersed in an insulating medium, said spark plug entrapping a volume of air in its lower portion when mounted, and means for reducing the volume of air trapped under the mounted spark plug whereby atmospheric pressure forces the insulating medium up around the electrodes of the mounted plug.

9. That method of testing spark plugs comprising, insulating the adjacent portion of the electrodes of a spark plug from each other, grounding one electrode of the spark plug, and applying high electrical pressure between the grounded electrode and the other electrode whereby current flows between the electrodes by other than its normal path.

10. That method of testing spark plugs having electrodes insulated from each other by a porcelain comprising the steps of immersing the lower portion of the spark plug in a liquid insulating medium and thereby trapping a volume of air in the lower portion of the spark plug, removing a portion of the entrapped air to permit the insulating medium to surround the exposed portion of the electrodes completely, and applying high electrical pressure between the electrodes to test the porcelain therebetween.

11. Apparatus for testing spark plugs comprising container means having a liquid insulating medium therein, positioning means for mounting a spark plug with its lower portion extending into the liquid insulating means whereby a volume of air is entrapped in the lower portion of the spark plug, means for removing a portion of the air entrapped by the spark plug to permit the liquid insulating means to cover the electrodes of the spark plug, and means for applying high electrical pressure between the electrodes.

12. In apparatus for testing spark plugs comprising container means having a liquid insulating medium therein, positioning means for mounting a spark plug with its lower portion extending into the liquid insulating means whereby a volume of air is entrapped in the lower portion of the spark plug, means for removing a portion of the air entrapped by the spark plug to permit the liquid insulating means to cover the electrodes of the spark plug, and cleaning means movably associated with said means for removing the entraped air whereby an open passageway therethrough can be maintained.

CLEVELAND C. SOPER.